United States Patent
Sinha

(10) Patent No.: US 6,970,360 B2
(45) Date of Patent: Nov. 29, 2005

(54) TAMPER-PROOF ENCLOSURE FOR A CIRCUIT CARD

(75) Inventor: Arvind Kumar Sinha, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 10/803,632

(22) Filed: Mar. 18, 2004

(65) Prior Publication Data

US 2005/0207127 A1    Sep. 22, 2005

(51) Int. Cl.[7] ................... H05K 5/06; H01L 23/28
(52) U.S. Cl. ............ 361/752; 361/737; 361/730; 174/52.2; 174/52.1; 174/52.3; 257/678; 257/679; 29/855; 29/841
(58) Field of Search ................ 361/737, 752; 174/50.6, 52.2; 257/679; 29/841, 848, 855, 29/856, 858; 235/492

(56) References Cited

U.S. PATENT DOCUMENTS

| | | | |
|---|---|---|---|
| 3,598,896 A | * | 8/1971 | Hassler et al. ............. 174/52.2 |
| 4,001,655 A | * | 1/1977 | Voyles et al. ................ 361/534 |
| 4,001,863 A | * | 1/1977 | Kobayashi et al. .......... 257/702 |
| 4,092,487 A | * | 5/1978 | Imai ........................... 174/52.2 |
| 4,848,566 A | * | 7/1989 | Havens et al. .............. 206/719 |
| 5,457,606 A | | 10/1995 | Young et al. |
| 5,596,486 A | | 1/1997 | Young et al. |
| 5,617,297 A | | 4/1997 | Lo et al. |
| 5,654,701 A | * | 8/1997 | Liao et al. ..................... 341/22 |
| 5,715,594 A | | 2/1998 | Patterson et al. |
| 5,774,339 A | * | 6/1998 | Ohbuchi et al. ............ 361/737 |
| 5,880,403 A | * | 3/1999 | Czajkowski et al. ....... 174/35 R |
| 6,049,468 A | | 4/2000 | Learmonth |
| 6,128,195 A | * | 10/2000 | Weber et al. ................ 361/737 |
| 6,241,153 B1 | | 6/2001 | Tiffany, III |
| 6,245,992 B1 | * | 6/2001 | Hou ............................. 174/50 |
| 6,249,442 B1 | * | 6/2001 | Watanabe ................... 361/801 |
| 6,384,332 B1 | * | 5/2002 | Skrzypchak ............... 174/52.2 |
| 6,541,874 B2 | * | 4/2003 | Nguyen et al. ............. 257/787 |
| 6,608,251 B1 | * | 8/2003 | Nurmi ..................... 174/35 GC |
| 6,686,539 B2 | | 2/2004 | Farquhar et al. |

* cited by examiner

Primary Examiner—Kamand Cuneo
Assistant Examiner—Dameon E. Levi
(74) Attorney, Agent, or Firm—Rabin & Berdo, P.C.

(57) ABSTRACT

A tamper-proof enclosure for an electrical card, such as a high speed communications card, includes an enclosure in which the card is mounted. The enclosure has a wall with an opening, and a cup member is attached to the wall at the opening. A bus that is connected to the card extends through a passage in the cup member and through the opening in the wall. A security mesh is wrapped around the enclosure. The cup member is filled with liquid resin, which is also coated onto the security mesh. After the resin is cured, the resin in the cup member forms a plug that seals the security mesh from inner pressure when the enclosure is heated to an elevated temperature. The resin is preferably polyamide.

16 Claims, 2 Drawing Sheets

TAMPER-PROOF ENCLOSURE FOR A CIRCUIT CARD

BACKGROUND OF THE INVENTION

The present invention is directed to a tamper-proof card enclosure, and more particularly to a tamper-proof card enclosure for use with a high speed communication card.

Many activities require secure communications. Diplomatic missions and military forces, for example, frequently find it necessary to communicate via messages that cannot reveal secret information if they are intercepted. Powerful encryption algorithms have been developed for converting uncoded messages into coded messages that can be transmitted securely since they can only be decoded by the intended recipient.

Financial institutions such as banks must also have access to reliable and secure communication channels to other financial institutions. The reason is that a breach in security might lead to substantial financial losses.

An encryption/decryption system may be implemented on a communications card that is included in equipment connected to a communications network. Such a communications card is an enticing target for malefactors since it may contain codes or keys to decrypt intercepted messages or to encode fraudulent messages. It is known that a communication card may be mounted in a metal enclosure which is then wrapped in a security mesh, and impregnated with polyurethane resin. A security mesh is a web or sheet of an insulating material with circuit elements such as closely spaced conductive lines fabricated on it. The circuit elements are disrupted if the mesh is torn, and this disruption can be sensed in order to generate an alarm signal. The alarm signal may be conveyed to a monitor in order to reveal an attack on the integrity of the communications card. The alarm signal may also trigger an erasure of encryption/decryption keys stored on the communications card.

Security mesh is commercially available from W. L. Gore & Associates, Inc., having an office at 555 Papermill Road, Newark, Del. 19711 (USA). A security mesh is also disclosed in U.S. Pat. No. 6,686,539 to Farquhar et al. The Farquhar et al patent is assigned to the Assignee of the present invention and is incorporated herein by reference.

FIG. 1 is a block diagram schematically illustrating communication between two financial institutions. A financial institution 10 such as a first bank has a number of items of electrical equipment that are connected to a control unit 12. Only two items of electrical equipment are shown in the drawing (items 14 and 16), but more are typically present. These items of electrical equipment may include automatic teller machines, terminals for operation by tellers, loan offices, and other employees of the bank, information storage units, and so on. The control unit 12 includes a communication card that is connected to a communications network 20. The communications card 18 permits the control unit 12 to communicate with a similar communication card (not illustrated) in a financial institution 22, such as a second bank. The control unit 12 includes an alarm unit 24 that detects whether a security mesh (not illustrated in FIG. 1) around the communications card 18 has been breached.

SUMMARY OF THE INVENTION

It is an object of the present invention to provide a tamper-proof card enclosure with enhanced reliability at elevated temperatures.

Another object is to protect a security mesh around an enclosure that contains a card from damage due to elevated temperatures within the enclosure.

A further object is to provide a stopper member for an opening in an enclosure that is wrapped with a security mesh.

These and other objects that will become apparent from the ensuing detailed description can be attained by providing an enclosure in which a card is mounted, the enclosure having a wall with an opening in it. The card includes a printed circuit board and at least one electrical component that is mounted on it. A cup member is attached to the wall of the enclosure at the opening, the cup member having a passage. A bus is connected to conductors on the printed circuit board and passes through the passage in the cup member and through the opening in the wall. A security mesh is wrapped around the enclosure, and a portion for the security mesh covers the opening in the wall. Resin is disposed in the cup member and coats the security mesh.

In accordance with another aspect of the invention, a bus is threaded through an opening in a wall of an enclosure and through a passage in a cup member that is attached to the wall at the opening. The bus is connected to the printed circuit board, which is mounted in the enclosure. The enclosure is wrapped with a security mesh. The cup member is filled with a liquid resin, and liquid resin is also coated onto the security mesh. The resin is then cured.

DESCRIPTION OF THE PREFERRED EMBODIMENT

The present invention arose from the discovery of a failure mode during testing of a new product by the Assignee of the present invention, and the invention of a technique for avoiding this failure mode. The new product is shown in FIG. 2.

Figure 1:
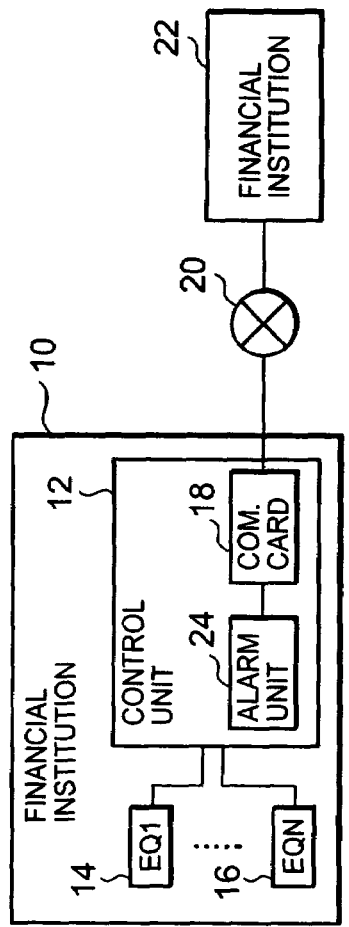
FIG. 1 is a block diagram schematically illustrating an example of communication between two financial institutions.
Figure 2:
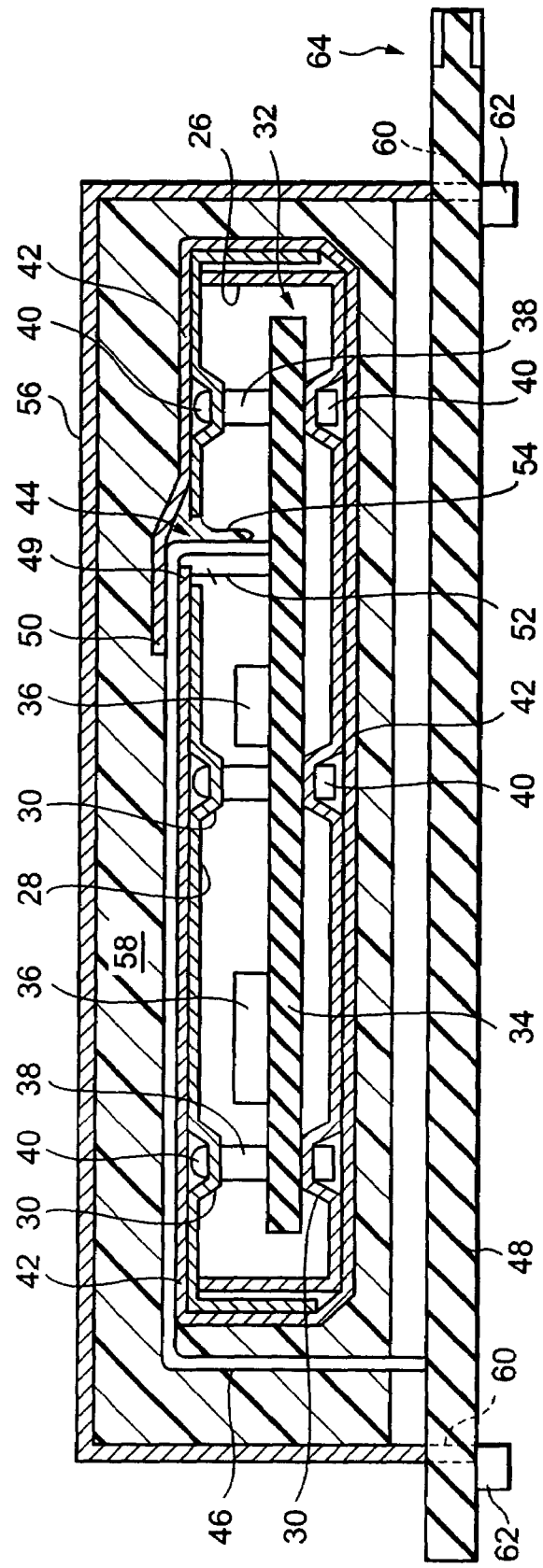
FIG. 2 is a cross-sectional view of a prior art tamper-proof enclosure for a communications card.

In FIG. 2, an enclosure is formed by a bottom metal shell 26 and a top metal shell 28. The outer faces of the shells 26 and 28 are provided with dimples 30. The communications card 32 rests on the dimples 30 on the bottom shell 26. The communications card 32 includes a printed circuit board 34 with integrated circuits 36, and possibly additional circuit elements (not shown) that are electrically connected to conductors (not shown) fabricated on the printed circuit board.

Hollow spacers 38 are placed below the dimples 30 of the top shell 28. Rivets 40 extend through openings in the dimples 30 of the top shell 26, through the hollow spacers 38, through openings in the printed circuit board 34, and though openings in the dimples 30 of the bottom shell 26 in order to secure the communications card 32 inside the enclosure formed by the metal shells 26 and 28.

With continuing reference to FIG. 2, a security mesh 42 is wrapped around the top, bottom, and four sides of the enclosure formed by the shells 26 and 28. The top shell 28 has an opening 44 through which a bus 46 extends. One end of the bus is connected to conductors (not shown) on the printed circuit board 34, and the other end is connected to conductors (not shown) on a printed circuit board 48. As it passes through the opening 44, the bus 46 extends between an inner edge region 49 of the security mesh 42 and an overlapping outer edge region 50 of the mesh 42. A group of wires 52 connect the security mesh 42 to conductors on the printed circuit board 34. Circuitry on the printed circuit board 34 is responsive to a break in the security mesh 42, in which case an alarm signal is emitted on the bus 46 and also encryption/decryption keys stored on the communications card 18 are erased.

Liquid polyurethane resin is slathered on the security mesh 42 and cured. Before it is cured, some of the resin may drip through the opening 44, and this is illustrated at 54. This is incidental, and neither improves nor hinders performance. A copper enclosure 56 is then filled with liquid polyurethane resin and the assembly is suspended in it. After the resin is cured, the communications card, enclosure, and security mesh are embedded in a polyurethane block 58, as shown.

The enclosure 56 is mounted on the printed circuit board 48. This can be accomplished by legs 60 that extend through slots in the PCB 48 and terminate in flanges 62 that are then bent out of alignment with the slots.

The bus 46 is connected, by way of the printed circuit board 48, to connectors 64 along one edge of the PCB 48.

A failure mode of the arrangement shown in FIG. 2 was discovered by the inventor during the heat-cycle testing of the arrangement shown in FIG. 2. In such testing, the arrangement was subjected to heating and cooling cycles, with the heating cycles increasing the temperature to 85° C. It was found that the heating increased the air pressure within the enclosure to the extent that stress on the security mesh 42 at the opening 44 was sometimes sufficient to break the security mesh. Furthermore, the polyurethane body 58 softened at high temperature, and the air pressure within the enclosure was sometimes sufficient to lift the outer edge region 50 of the security mesh and permit heated air to accumulate above the top shell 28. This accumulation of air, in turn, could cause the back wall of the enclosure 56 to bow outward.

Figure 3:
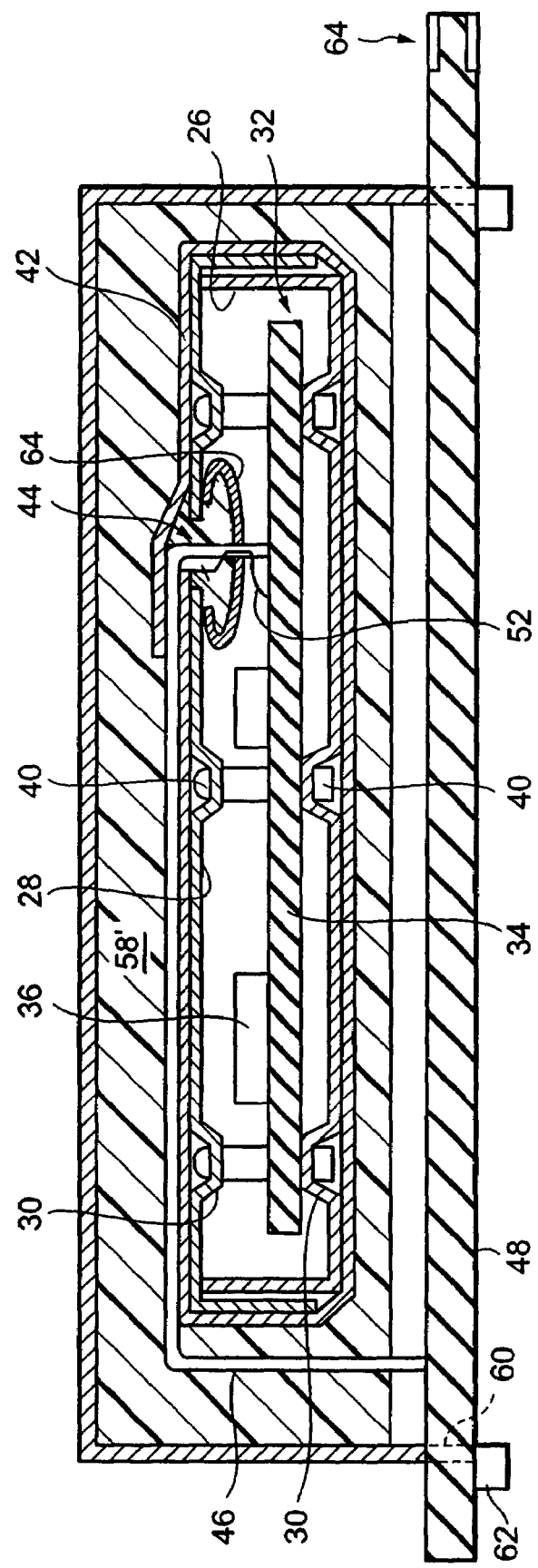
FIG. 3 is a cross-sectional view of a tamper-proof enclosure for a communications card in accordance with the present invention.

The solution to these problems that was devised by the inventor has two aspects. First, as shown in FIG. 3, polyamide resin is used to bathe the security mesh and form the body in which the enclosure is embedded. This provides a polyamide block 58' in lieu of the polyurethane block 58 shown in FIG. 2. Polyamide is stiffer than polyurethane at elevated temperatures, and this decreases the proclivity of the outer edge region 50 to delaminate. Secondly, a sealing mechanism is provided at the opening 44. In FIG. 3, the sealing mechanism consists of a shallow cup 64 that is connected (as by soldering) to the top metal shell 28 just below the opening 44. At its bottom, the cup 64 has a slot for passage of the bus 46 and the wires 52. The liquid polyamide resin is spread onto the security mesh 42 wrapped around the enclosure formed by the shells 26 and 28, and resin is introduced into the cup so as to fill the cup. As a result, a plastic plug that seals the opening 44 is formed. This further reduces the forces tending to delaminate the outer edge region 50 and reduces the stress on the security mesh 42 above the opening 44.

While the above explanation of the preferred embodiment of this invention has used a communications card as an example, it ill be apparent that the invention may be used with other types of cards as well.

It will be understood that the above description of the present invention is susceptible to various modifications, changes, and adaptations, and the same are intended to be comprehended within the meaning and range of equivalents of the appended claims.

What I claim is:

1. A tamper-proof enclosure for a card that includes a printed circuit board and at least one electrical component mounted on the card, comprising:
    an enclosure in which the card is mounted, the enclosure having a wall with an opening in it;
    a cup member attached to the wall at the opening, the cup member having a passage;
    a bus connected to conductors on the board, the bus passing through the passage in the cup member and through the opening in the wall;
    a security mesh wrapped around the enclosure, a portion of the security mesh covering the opening in the wall; and
    resin in the cup member and coating the security mesh.

2. The tamper-proof enclosure of claim 1, wherein the resin is polyamide.

3. The tamper-proof enclosure of claim 1, wherein the security mesh has a first edge region adjacent the opening in the wall and a second edge region that overlaps the first edge region.

4. The tamper-proof enclosure of claim 3, wherein the bus extends between the first and second edge regions of the security mesh.

5. The tamper-proof enclosure of claim 1, wherein the cup member and the wall are both metallic, and the cup member is attached to the wall by solder.

6. The tamper-proof enclosure of claim 1, wherein the enclosure is a first enclosure, and further comprising a second enclosure, the first enclosure being contained in the second enclosure and embedded in a resinous block.

7. The tamper-proof enclosure of claim 6, wherein the resinous block is made of polyamide.

8. The tamper-proof enclosure of claim 6, in combination with another printed circuit board on which the second enclosure is mounted, the bus being connected to conductors on the another printed circuit board, the another printed circuit board having connector contacts at an edge thereof.

9. The tamper-proof enclosure of claim 8, wherein the card is a communications card.

10. The tamper-proof enclosure of claim 1, wherein the card is a communications card.

11. A method for packaging an electrical card that includes a printed circuit board and at least one electrical component mounted on the printed circuit board, comprising the steps of:
    (a) threading a bus through an opening in a wall of an enclosure and through a passage in a cup member that is attached to the wall at the opening;
    (b) connecting the bus to the printed circuit board;
    (c) mounting the printed circuit board in the enclosure;
    (d) wrapping the enclosure with a security mesh;
    (e) coating the security mesh and filling the cup member with liquid resin; and
    (f) curing the resin.

12. The method of claim 11, wherein the resin is polyamide.

13. The method of claim 11, wherein step (c) is conducted so that the security mesh has a first edge region disposed adjacent the opening in the wall and a second edge region that overlaps the first edge region.

14. The method of claim 13, wherein the bus extends between the first and second edge regions.

15. The method of claim 11, wherein the enclosure is a first enclosure, and further comprising placing the first enclosure in a second enclosure, filling the second enclosure with liquid resin to a predetermined depth, and curing the resin.

16. The method of claim 15, further comprising mounting the second enclosure on another printed circuit board, and connecting the bus to conductors on the another printed circuit board.

* * * * *